United States Patent [19]

Culp et al.

[11] 4,230,578

[45] Oct. 28, 1980

[54] SEWAGE EFFLUENT VOLUME CONTROL AND ALARM ARRANGEMENT FOR PRESSURIZED SEWAGE DISPOSAL SYSTEM

[75] Inventors: Richard E. Culp, Eastlake; Robert G. Baker, Mentor, both of Ohio

[73] Assignee: Jet, Inc., Cleveland, Ohio

[21] Appl. No.: 28,223

[22] Filed: Apr. 9, 1979

[51] Int. Cl.³ .............................................. C02C 1/00
[52] U.S. Cl. ..................................... 210/86; 210/104; 210/121; 210/532 S
[58] Field of Search ............... 210/86, 96.1, 104, 119, 210/121, 532 S

[56] References Cited

U.S. PATENT DOCUMENTS

| | | | |
|---|---|---|---|
| 3,679,053 | 7/1972 | Koulovatos et al. | 210/86 |
| 3,925,206 | 12/1975 | Dea | 210/104 |
| 4,042,497 | 8/1977 | Maltby | 210/104 X |

OTHER PUBLICATIONS

Chemical Engineering Magazine, pp. 226–227, 6/12/61.

Primary Examiner—John Adee
Attorney, Agent, or Firm—Woodling, Krost & Rust

[57] ABSTRACT

Sewage effluent from a septic tank collects in a holding tank before being pumped out into a disposal field. The pump is turned on and off automatically by a control circuit which includes maximum and minimum level float switches in the holding tank, so that a predetermined volume of the effluent is discharged under pressure into the disposal field during each on-and-off cycle of the pump. A third float switch in the holding tank triggers an alarm whenever the effluent rises above a predetermined maximum level. The alarm signalling system may be silenced or tested by a manual switch.

19 Claims, 5 Drawing Figures

4,230,578

SEWAGE EFFLUENT VOLUME CONTROL AND ALARM ARRANGEMENT FOR PRESSURIZED SEWAGE DISPOSAL SYSTEM

SUMMARY OF THE INVENTION

This invention relates to a control arrangement which is particularly intended for a system for pumping septic tank effluent into a disposal field.

An important aspect of this invention is the provision of a novel control for turning on and off a pump in a holding tank which receives sewage effluent from a septic tank, so that a predetermined volume of the effluent is discharged under pressure into a disposal field each time the pump operates. Saturation of the disposal field is avoided by controlling the volume of the effluent discharged during a given on-and-off cycle of the pump, which insures that the capacity of the disposal field is not exceeded. The pressurized discharge causes the effluent to be substantially evenly distribed throughout the disposal field instead of tending to concentrate in only a localized area, as can happen with conventional gravity flow septic tank systems.

Another important aspect of this invention is the provision of a novel alarm signalling arrangement for such a holding tank to tell the user when the effluent rises above the predetermined maximum level at which the pump is supposed to come on and begin discharging the effluent into the disposal field. Preferably, this alarm signalling arrangement includes a "test" switch which may be operated manually to determine whether the alarm is functioning properly. Preferably, also, the present alarm signaling arrangement has a visual alarm signalling device and an audible alarm signalling device which may be silenced by the user after recognizing that the alarm has been sounded.

Preferably, both the pump control and the alarm signalling arrangement are incorporated in a unitary control system which operates automatically in response to three float switches in the holding tank: a maximum level switch which turns on the pump, a minimum level switch which turns off the pump, and an alarm switch for signalling the alarm when the effluent in the holding tank rises above the level at which the maximum level switch is supposed to turn on the pump.

Additional characteristics and advantages of the present invention will be apparent from the following detailed description of a presently-preferred embodiment which is shown in the accompanying drawings.

DETAILED DESCRIPTION

Figure 1:
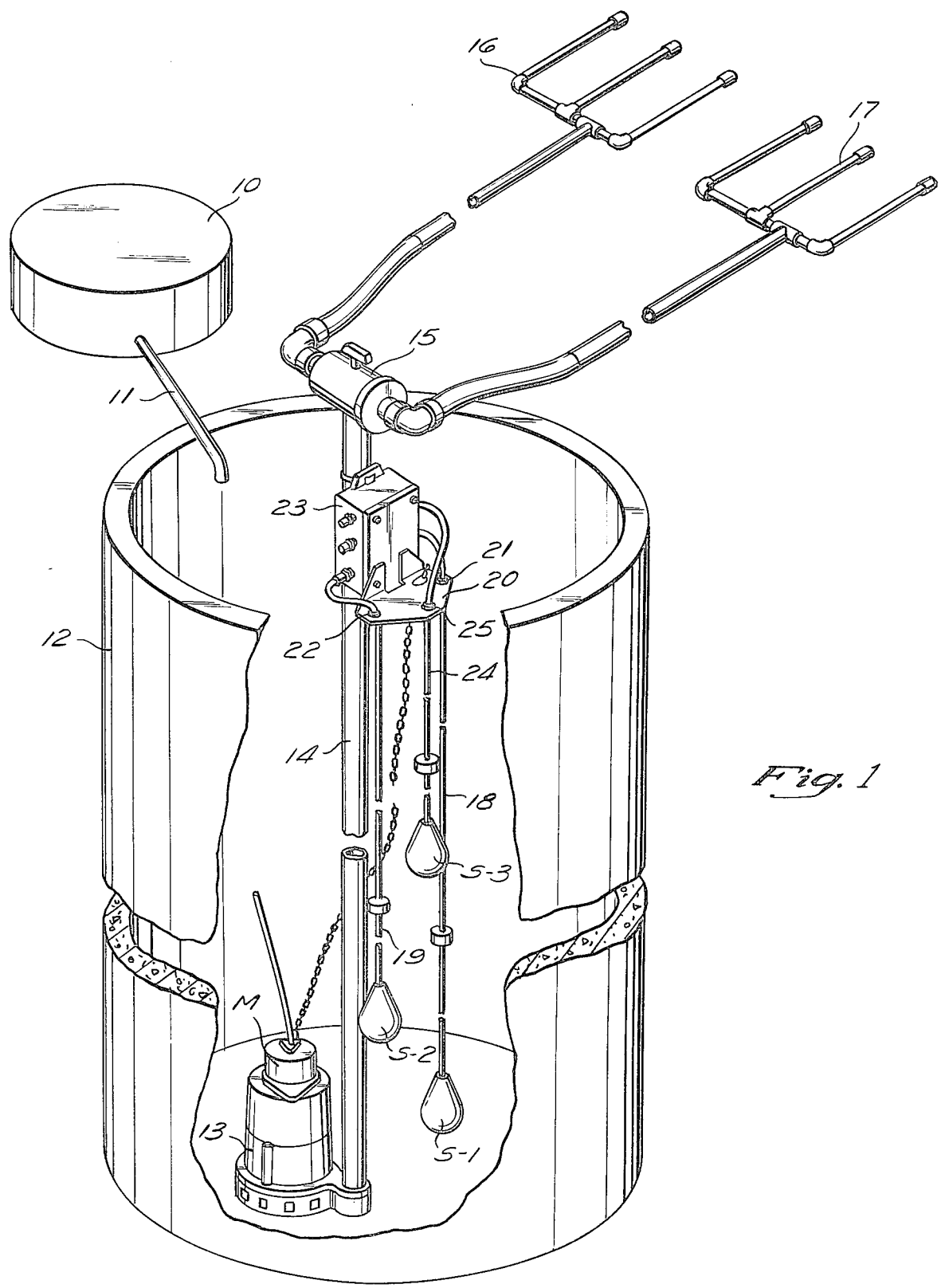
FIG. 1 is a schematic perspective view, with parts broken away for clarity, illustrating a sewage disposal system embodying the present sewage effluent volume control.

Referring to FIG. 1, the sewage disposal system illustrated schematically there has a septic tank 10 with a discharge line 11 for passing sewage effluent by gravity flow into a holding tank 12. A submersible pump 13 in the bottom of the holding tank pumps the effluent up through a vertical outlet pipe 14 to a manually operated directional valve 15, which passes the effluent to one or the other of two disposal fields 16 and 17. The pump is driven by a submersible electric Motor M.

It is to be understood that just a single disposal field may be provided, in which case the directional valve 15 may be omitted. Each disposal field may be a sand or gravel bed below the surface of the ground or it may be a sand filter or mound system of known design.

The pump 13 is driven by an electric motor M which is turned off by a first float switch S-1 and turned on by a second float switch S-2, as described in detail hereinafter. Both switches S-1 and S-2 are mercury tube switches encapsulated in weighted polyurethane floats. The first switch S-1 is a normally-open switch which is held closed by the presence of the effluent. It opens when the effluent in the holding tank 12 drops to a predetermined minimum level. The second float switch S-2 is normally open, and it is actuated closed when the effluent in the holding tank 12 rises to a predetermined maximum level.

These switches are on the lower ends of respective flexible, fluid-tight cables 18 and 19 which extend down from a horizontal shelf 20 at the upper end of the holding tank. Clamping nuts 21 and 22 at the shelf enable the respective cable lengths below the shelf 20 to be adjusted for setting the minimum effluent level and the maximum effluent level at which these switches are actuated. Each cable 18 and 19 contains electrical wiring which connects the corresponding switch in an electrical control circuit (FIG. 2) whose other components are located inside a control box 23. The shelf 20 is bolted to the control box 23. The control box is clamped to the effluent outlet pipe 14 at the upper end of the holding tank 12 a short distance below the directional valve 15.

Figure 3:
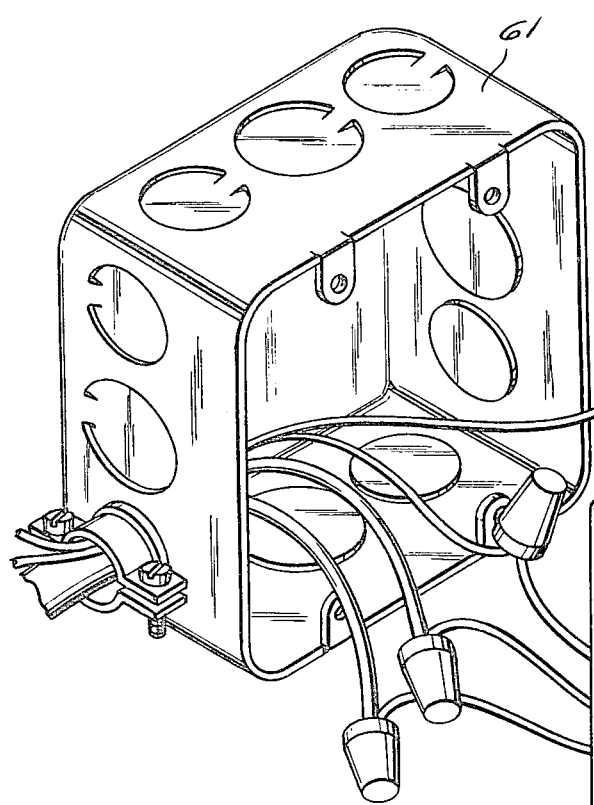
FIG. 3 is an exploded perspective view of the housing for the present alarm signalling arrangement in the sewage disposal system of FIG. 1.

A similar normally-open third float switch S-3 is on the lower end of a flexible, fluid-tight cable 24 suspended from the shelf 20. A clamping nut 25 at the shelf enables the length of this cable below the shelf to be adjusted. The third switch S-3 is an alarm switch which is suspended by cable 24 at a level higher than the level at which the second switch S-2 is suspended by its cable 19. Therefore, the third switch S-3 will be actuated only if the effluent rises in the holding tank above the predetermined maximum level set by the adjustment of the second switch cable 19. The cable 24 for the third switch S-3 contains electrical wiring which extends up into the control box 23 and from there to an alarm signalling circuit located in an enclosure (FIGS. 3 and 4) which is outside the holding tank and accessible for manual control, as explained hereinafter.

EFFLUENT LEVEL CONTROL CIRCUIT—FIG. 2

Figure 2:
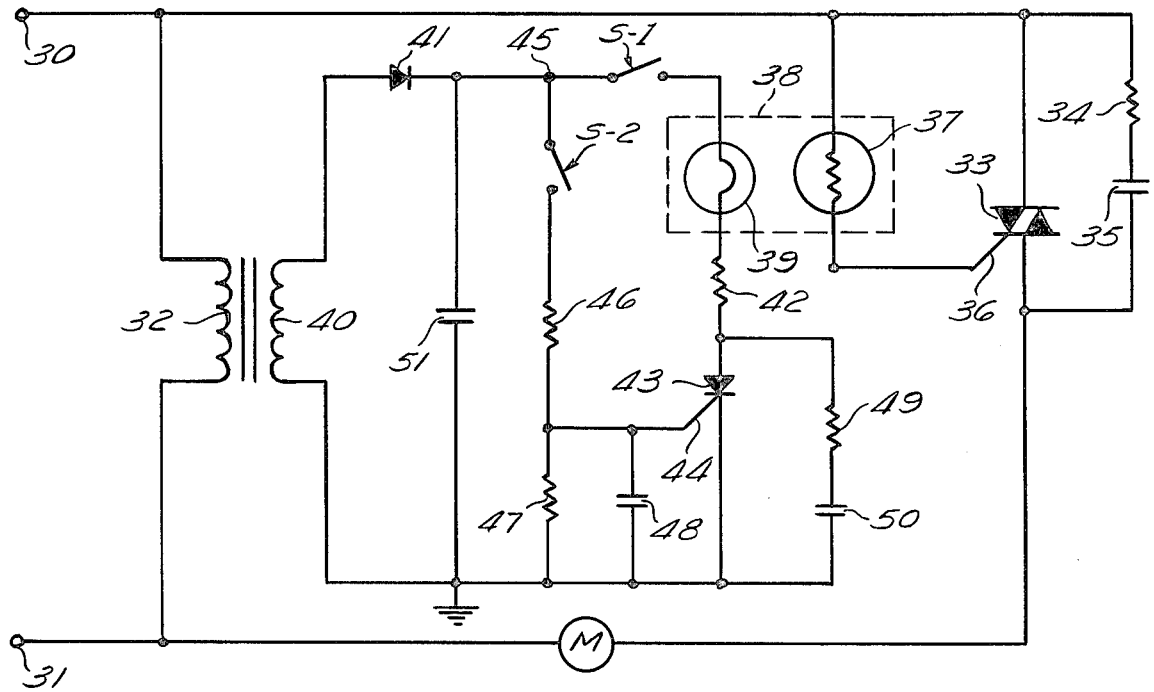
FIG. 2 is a circuit diagram of this control.

The minimum-level switch S-1 and the maximum-level switch S-2 are part of a control circuit for the pump motor M, as shown schematically in FIG. 2.

In this Figure the terminals 30 and 31 of a 115 volt A.C. power supply are connected across the primary winding 32 of a step-down transformer. The pump motor M is connected across the 115 volt power supply through a "Triac" 33, which is a bidirectional semiconductor switching device of known design capable of conducting current in both half cycles of the A.C.

power. A resistor 34 and a capacitor 35 are connected in series with each other across the Triac 33 to insure proper commutation and prevent undesired turn-on, such as due to random noise signals. The Triac 33 has a gate electrode 36 for turning it on and off. This gate electrode is connected to the power supply terminal 30 through a photoelectric cell 37 of known design.

The photocell 37 is part of a control device, indicated generally at 38, which also includes a lamp 39. This lamp is an electrically energizable element for activating the photocell 37, which is the gating means for the Triac 33.

The transformer has a 10 volt secondary winding 40 which is inductively coupled to the transformer primary winding 32. The upper terminal of the transformer secondary winding 40 is connected through a semiconductor rectifier 41 and the minimum level float switch S-1 to one side of the lamp 39. The opposite side of this lamp is connected through a resistor 42 and the anode-cathode path of a silicon controlled rectifier (SCR) 43 to the lower terminal of the transformer secondary winding 40, which is grounded.

SCR 43 has a gate electrode 44 which is connected through a resistor 46 and the maximum level float switch S-2 to the juncture 45 between rectifier 41 and the minimum level float switch S-2. A resistor 47 and a capacitor 48 are connected in parallel with each other between the gate electrode 44 of SCR 43 and the grounded lower terminal of the transformer secondary winding 40.

A resistor 49 and a capacitor 50 are connected in series with each other across the anode-cathode path of the SCR 43.

A capacitor 51 is connected between the grounded lower terminal of the transformer secondary winding 40 and the juncture 45 between the rectifier 41 and the minimum level switch S-1.

When the pump 13 is off and the effluent level in the holding tank 12 is somewhere between the minimum level at which switch S-1 will be actuated and the maximum level at which switch S-2 will be actuated, switch S-1 will be in its closed condition and switch S-2 will be in its normally open (unactuated) condition. Consequently, the SCR 43 will be off, the lamp 39 will be off, the photocell 37 will not be activated, the Triac 33 will be off, and the pump motor M will be off.

When the effluent rises in the holding tank to the predetermined maximum level and closes the maximum level switch S-2, the gate electrode 44 turns on the SCR 43, with current flowing through the anode-cathode path of the SCR through the now-closed minimum level switch S-1. The lamp 39 in the control device 38 turns on and activates the photocell 37, which in turn causes the Triac 33 to turn on and thereby connect the pump motor M across the A.C. power supply terminals 30 and 31.

This turns on the pump 13, which now pumps effluent out of the holding tank 12. This will cause the maximum level switch S-2 to return to its normally open condition, but this has no effect on the circuit because the SCR 43 will remain on after removal of the turn-on signal on its gate electrode 44 as long as the minimum level switch S-1 in its anode-cathode path remains closed. After a time the effluent level in the holding tank drops far enough to enable the minimum level switch S-1 to open. With switch S-1 now open, the SCR 43 and lamp 39 are turned off, the Triac 33 is turned off, and the pump motor M is stopped. The pump 13 will stay off until the effluent level in the holding tank rises far enough to again actuate (close) the maximum level switch S-2 (at which time the minimum level switch S-1 will already be in its closed condition).

With this control arrangement, a predetermined volume of effluent is permitted to accumulate in the holding tank and then this volume of effluent (as determined by the settings of the minimum and maximum level switches S-1 and S-2) is discharged by the pump under pressure into the disposal field 16 or 17. This pressurized discharge causes this predetermined volume of the effluent to be substantially evenly distributed throughout the disposal field, avoiding the unsatisfactory results sometimes encountered with gravity-flow disposal systems. Saturation of the disposal field is prevented because it has to handle only a predetermined volume of the effluent at one time.

In one practical embodiment the elements of this control circuit have the following values:
capacitor 51—220 mfd.
capacitor 48—1.0 mfd.
capacitor 50—0.01 mfd.
capacitor 35—0.01 mfd.
resistor 46—2,700 ohms
resistor 47—470 ohms
resistor 42—75 ohms
resistor 49—33 ohms
resistor 34—10 ohms

ALARM SIGNALLING—FIG. 5

Figure 5:
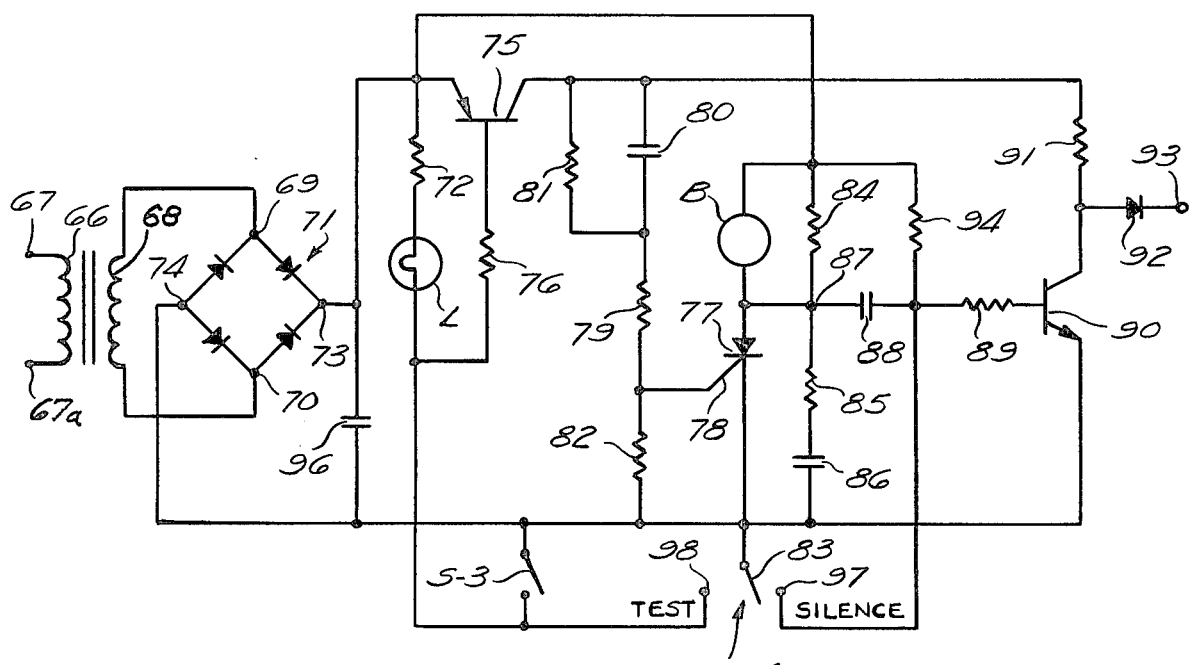
FIG. 5 is a circuit diagram of the alarm signalling arrangement for the FIG. 1 system.
Figure 4:
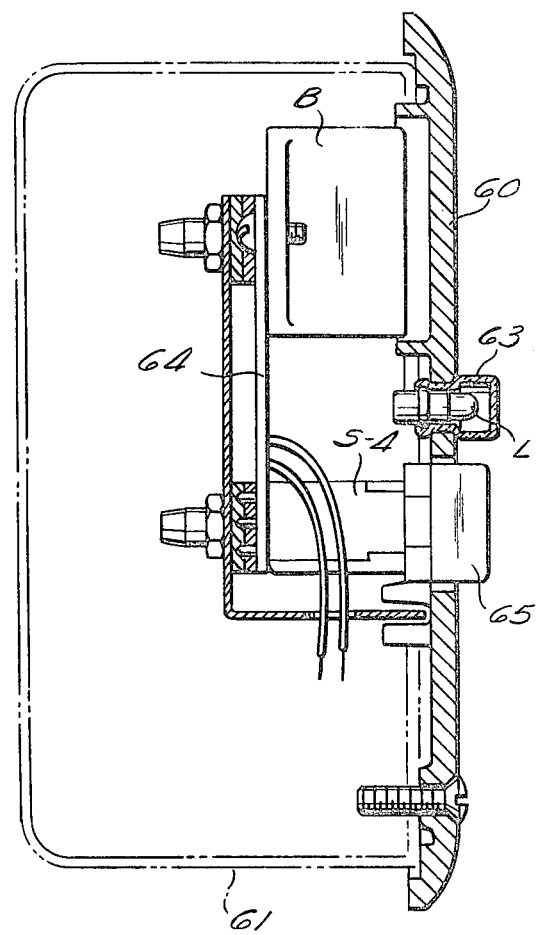
FIG. 4 is a vertical section through this housing, part of which is shown in phantom.

The third float switch S-3 in the holding tank is part of an alarm signalling circuit shown schematically in FIG. 5. The alarm signalling circuit contains an audible alarm device in the form of a buzzer B of known design and a visual alarm device in the form of a lamp L. As shown in FIG. 4, the buzzer B is mounted behind the front panel 60 on a box-like housing 61. This front panel has small openings 62 (FIG. 5) directly in front of the buzzer. The lamp L is mounted behind a red lens 63 carried by the front panel 60 directly below the openings 62 in front of the buzzer.

A printed circuit panel 64 is rigidly supported inside the housing 61, extending parallel to the front panel 60. The buzzer B is physically supported by this panel, as well as being electrically connected in the circuit on this panel as shown schematically in FIG. 5. The same is true of the lamp L. Preferably, the alarm housing 61 is located at the building which is served by the sewage disposal system, and suitably shielded, weather proof wiring extends from the alarm housing to the control box 23 for the holding tank.

A selector switch S-4 also is physically supported by the printed circuit panel 64 and is electrically connected in the circuit on this panel as shown in FIG. 5. Switch S-4 is a manually operated, single pole, double throw switch operated by a finger-operated rocker arm 65 which projects through the front panel 60 on the housing. The rocker arm 65 has a neutral positon centered between a "test" position at one side and a "silence" position at the opposite side. Preferably, the rocker arm has a spring return which moves it back to the neutral position when it is released after being pivoted to either the "test" position or the "silence" position.

Referring now to FIG. 5, the alarm signalling circuit has a step-down transformer with a primary winding 66 connected across the terminals 67 and 67a of a 115 volt A.C. power supply. The secondary winding 68 of this transformer is connected across the opposite input terminals 69 and 70 of a full-wave rectifier 71, which converts the stepped-down A.C. power to D.C.

One terminal of the alarm signalling lamp L is connected through a resistor 72 to one output terminal 73 of the full wave rectifier 71. The opposite terminal of lamp L is connected to the opposite output terminal 74 of rectifier 71 through either the third float switch S-3 in the holding tank or the "test" contacts of selector switch S-4. Normally, both switch S-3 and the "test" contacts of switch S-4 will be open and therefore lamp L will be off.

A capacitor 96 is connected across the output terminals 73 and 74 of the full wave rectifier 71.

A semiconductor switching device in the form of a transistor 75 has its emitter connected directly to the rectifier output terminal 73 and its base connected through a resistor 76 to the fixed contact of the switch S-3 and to the fixed "test" contact of the switch S-4.

One terminal of the buzzer B is connected directly to the rectifier output terminal 73. The opposite terminal of buzzer B is connected through the anode-cathode path of a silicon controlled rectifier (SCR) 77 directly to the opposite terminal 74 of full wave rectifier 71. SCR 77 has a gate electrode 78 which is connected to the collector of transistor 75 through a resistor 79 and a parallel combination of capacitor 80 and resistor 81. A resistor 82 is connected between the gate electrode 78 of SCR 77 and the output terminal 74 of full wave rectifier 71.

The selector switch S-4 has its manually operated mobile contact 83 connected directly to the cathode of SCR 77 and the output terminal 74 of full wave rectifier 71.

A resistor 84 is connected across the buzzer B.

A resistor 85 and a capacitor 86 are connected in series with each other across the anode and cathode in SCR 77.

The juncture 87 between resistors 84 and 85 is connected through a capacitor 88 and a resistor 89 to the base of a transistor 90. The collector of transistor 90 is connected through a resistor 91 to the collector of transistor 75. Also, the collector of transistor 90 is connected through a rectifier 92 to an output terminal 93. The emitter of transistor 90 is connected directly to the mobile contact 83 of selector switch S-4, the mobile contact of the third float switch S-3, and the output terminal 74 of the full wave rectifier.

A resistor 94 is connected across resistor 84 and capacitor 88.

In the operation of this circuit, with the manually operated selection switch S-4 in its neutral position, as shown, if the effluent level in the holding tank rises far enough to actuate (close) the third float switch S-3, this will complete an energization circuit for the lamp L across the output terminals 73 and 74 of the full wave rectifier 71. The energization of lamp L causes transistor 75 to turn on to saturation and apply a turn-on pulse through capacitor 80 and resistor 79 to the gate electrode 78 of SCR 77. Consequently, SCR 77 is turned on, completing a current path for the buzzer B across the output terminals 73 and 74 of full wave rectifier 71. This current path for buzzer B is independent of the third float switch S-3.

The now-energized lamp L provides a visual signal and the now-energized buzzer B provides an audible signal of the alarm condition of the effluent level in the holding tank.

If now the alarm float switch S-3 re-opens, the lamp L will go out but the buzzer B will remain on because SCR 77 would remain on.

Transistor 90 is biased off until transistor 75 turns on. The saturation of transistor 75 turns on transistor 90 and keeps it on except when SCR 77 first turns on and applies a negative pulse through capacitor 88 to the base of transistor 90, turning it off momentarily and producing a voltage pulse at terminal 93 of about one millisecond duration. This extraneous pulse should be filtered out elsewhere in the system.

If the selector switch S-4 is actuated to the "silence" position, with its mobile contact 83 now engaging the fixed contact 97, this turns off SCR 77 because the charge on capacitor 88 back-biases the anode of SCR 77 and commutates it. Consequently, the buzzer B goes off now. However, the lamp L stays on if the float switch S-3 is still closed (which should be the case as long as the effluent level in the holding tank is at the alarm level). Also the operation of switch S-4 to the "silence" position will turn off transistor 90 and produce a positive output signal at terminal 93 during the interval that switch S-4 remains held in its "silence" position. This output signal at 93 can be used to perform an additional control function, such as turning on or off an external device (not shown).

This alarm signalling system may be tested manually to determine if it is functioning properly. This is done by manually operating the rocker arm 65 of switch S-4 to the "test" position, in which its mobile contact 83 engages fixed contact 98. This should produce the same results as the closing of the alarm float switch S-3. That is, the lamp L and the buzzer B should come on, with the lamp L going out as soon as the switch contacts 83 and 98 disengage but with the buzzer B remaining on until the "silence" contacts 83 and 97 of switch S-4 are closed.

In this circuit, the function of resistor 81 is to insure that capacitor 80 discharges between cycles.

The function of capacitor 88, resistor 85 and capacitor 86 is to prevent undesired turn-on of SCR 77. Resistor 86 insures that the current through the anode-cathode path of SCR 77 is high enough to keep it on if transistor 75 goes off.

In a presently-preferred embodiment the alarm signalling arrangement shown in FIG. 5 has the following component values:

capacitor 96—220 mfd.
capacitor 80—0.01 mfd.
capacitor 86—0.01 mfd.
capacitor 88—0.1 mfd.
resistor 72—22 ohms
resistor 76—2,200 ohms
resistor 81—1 megohm
resistor 79—2,200 ohms
resistor 82—470 ohms
resistor 84—1,000 ohms
resistor 85—33 ohms
resistor 94—1,000 ohms
resistor 89—22,000 ohms
resistor 91—1,000 ohms If desired, the present alarm signalling arrangement may be used with a holding tank for liquid other than sewage effluent.

I claim:

1. In a sewage disposal system for passing effluent from a septic tank to a disposal field, said system having:

a holding tank operatively connected to the septic tank to receive effluent therefrom;

a pump for discharging effluent from the holding tank to a disposal field;

an electric motor driving said pump;

a first switch operatively arranged to be closed while the effluent in the holding tank is above a predetermined minimum level and to open when the effluent drops below said minimum level;

and a second switch operatively arranged to be open while the effluent in the holding tank is below a predetermined maximum level and to close when the effluent in the holding tank rises to a said maximum level;

the improvement which comprises a level control circuit for turning off the pump in response to the opening of said first switch and for turning on the pump in response to the closing of said second switch, said level control circuit including:

an A.C. power supply for the pump motor;

a bidirectional semiconductor switching device connected in series with the pump motor across said A.C. power supply;

a control device having means for gating on said bidirectional switching device and having an electrically energizable element for activating said gating means;

a step-down transformer having a primary winding connected across said A.C. power supply and having a lower voltage secondary winding inductively coupled to said primary winding;

an SCR having an anode-cathode path connected in series with said first switch and said electrically energizable element of said control device across said secondary winding, said SCR having a gate electrode;

and means operatively connecting said second switch between said secondary winding and said gate electrode of said SCR to turn on the SCR and thereby energize said electrically energizable element of said control device in response to the closing of said second switch;

said SCR, after being turned on, being operative to stay on independent of said second switch as long as said first switch remains closed.

2. A system according to claim 1, wherein said first and second switches are encapsulated float switches, each having a flexible cable suspending it at a predetermined level in the holding tank.

3. A system according to claim 2, and further comprising means for adjusting the suspended length of each switch cable in the holding tank.

4. A system according to claim 1, wherein said gating means in said control device is a photoelectric cell, and said electrically energizable element in said control device is a lamp.

5. A system according to claim 1, and further comprising a rectifier connected between one side of said secondary winding of the transformer and said first and second switches and a capacitor connected between the opposite side of said secondary winding and the juncture between said rectifier and said first and second switches.

6. A system according to claim 1, and further comprising a resistance-capacitance filter operatively connected to said SCR to prevent noise from turning on said SCR.

7. A system according to claim 1, and further comprising a resistor and a capacitor connected across said bidirectional switching device and operative to insure proper commutation and to prevent said bidirectional switching device from turning on except in response to the activation of said gating means in said control device.

8. A system according to claim 3, wherein said gating means in said control device is a photoelectric cell, and said electrically energizable element in said control device is a lamp, and further comprising:

a rectifier connected between one terminal of said secondary winding of the transformer and said first and second switches, and a capacitor connected between the opposite terminal of said secondary winding and the juncture between said rectifier and said first and second switches;

a resistance-capacitance filter operatively connected to said SCR to prevent noise from turning on said SCR;

and a resistor and a capacitor connected across said bidirectional switching device and operative to insure proper commutation and to prevent said bidirectional switching device from turning on except in response to the activation of said gating means in said control device.

9. A system according to claim 8, and further comprising:

a normally-open third switch operatively arranged to be closed when the effluent in the holding tank rises past said predetermined maximum level;

and alarm signalling means operatively connected to said third switch to signal an alarm in response to the closing of said third switch.

10. A system according to claim 9, wherein said alarm signalling means comprises a lamp and an audible alarm device, and a manual switch for turning off said audible alarm device without turning off said lamp as long as said third switch remains closed.

11. A system according to claim 9, and further comprising a manual switch operatively connected to said alarm signalling means in parallel with said third switch for testing the operation of said alarm signalling means.

12. A system according to claim 9, and further comprising a single pole, double throw manual switch having a silence position for turning off said audible alarm device without turning off said lamp as long as said third switch remains closed and a test position in parallel with said third switch for testing the operation of said alarm signalling means.

13. In a system having:

a holding tank for holding liquid;

a pump for discharging the liquid from the holding tank;

a first switch operatively arranged to be closed while the liquid in the holding tank is above a predetermined minimum level and to open when the liquid drops below said minimum level;

a second switch operatively arranged to be open while the liquid in the holding tank is below a predetermined maximum level and to close when the liquid in the holding tank rises to said maximum level;

and means for turning off the pump in response to the opening of said first switch and for turning on the pump in response to the closing of said second switch;

an alarm signalling arrangement comprising:

a normally-open third switch operatively arranged to be closed when the liquid in the holding tank rises past said predetermined maximum level;

and alarm signalling means operatively connected to said third switch to signal an alarm in response to the closing of said third switch.

14. A system according to claim 16, wherein said alarm signalling means comprises a lamp and an audible alarm device, and a manual switch for turning off said audible alarm device without turning off said lamp as long as said third switch remains closed.

15. A system according to claim 13, and further comprising a manual switch operatively connected to said alarm signalling means in parallel with said third switch for testing the operation of said alarm signalling means.

16. A system according to claim 13, and further comprising a single pole, double throw manual switch having a silence position in which it is operatively connected to said audible alarm device to turn it off and having a test position in which it is connected in parallel with said third switch for testing the operation of said alarm signalling means.

17. A system according to claim 13, and further comprising an output terminal, and circuit means operatively connecting said third switch to said output terminal to provide an output signal thereat as long as said third switch remains closed even after said manual switch turns off said audible alarm device.

18. A system according to claim 13, wherein said alarm signalling arrangement comprises:

a D.C. power supply having a pair of output terminals;

a lamp connected in series with said third switch across the power supply output terminals;

an SCR having anode, cathode and gate electrodes;

an audible alarm device connected in series with with the anode-cathode path of said SCR across the output terminals of the power supply;

and a semiconductor switching device operatively connected to said gate electrode to turn on said SCR in response to the energization of said lamp.

19. A system according to claim 18 and further comprising a single pole, double throw manual switch having a mobile contact connected to one output terminal of said power supply, a first fixed contact operatively connected to the other output terminal of said power supply to turn off said audible alarm device when said first fixed contact is engaged by said mobile contact, and a second fixed contact connected in series with said lamp to said other output terminal of the power supply to turn on said lamp when said second fixed contact is engaged by said mobile contact.

* * * * *